United States Patent [19]

Brown

[11] Patent Number: 5,480,298
[45] Date of Patent: Jan. 2, 1996

[54] COMBUSTION CONTROL FOR PRODUCING LOW $NO_x$ EMISSIONS THROUGH USE OF FLAME SPECTROSCOPY

[75] Inventor: Dale M. Brown, Schenectady, N.Y.

[73] Assignee: General Electric Company, Schenectady, N.Y.

[21] Appl. No.: 332,190

[22] Filed: Oct. 31, 1994

Related U.S. Application Data

[63] Continuation-in-part of Ser. No. 226,528, Apr. 12, 1994, which is a continuation-in-part of Ser. No. 47,936, Apr. 19, 1993, Pat. No. 5,303,684, which is a division of Ser. No. 878,933, May 5, 1992, Pat. No. 5,257,496.

[51] Int. Cl.$^6$ ................................................. F23N 5/08
[52] U.S. Cl. ................................................. 431/79
[58] Field of Search ................................. 431/12, 75, 79

[56] References Cited

U.S. PATENT DOCUMENTS

| | | | |
|---|---|---|---|
| 3,720,495 | 3/1973 | Zink et al. | 431/184 |
| 3,904,349 | 9/1975 | Peterson et al. | 431/184 |
| 4,043,742 | 8/1977 | Egan et al. | 431/79 |
| 4,934,926 | 6/1990 | Yamazaki et al. | 431/79 |
| 5,024,055 | 6/1991 | Sato et al. | |
| 5,037,291 | 8/1991 | Clark | 431/12 |
| 5,222,887 | 6/1993 | Zabielski | 431/79 |
| 5,257,496 | 11/1993 | Borwn et al. | |
| 5,303,684 | 4/1994 | Brown et al. | |
| 5,332,386 | 7/1994 | Hosome et al. | 431/79 |

FOREIGN PATENT DOCUMENTS

| | | |
|---|---|---|
| 56-92326 | 7/1981 | Japan . |
| 61-197726 | 9/1986 | Japan . |

OTHER PUBLICATIONS

"Research Into a Spectral Flame Analyzer Phase 1–Final Report for the Period Apr. 21, 1983–Jun. 30, 1985" by F. Frain, US Doe Contract No. DE—AC07—83 1D12463; Jun. 1, 1985.

"Silicon Carbide UV Photodiodes" by Dale M. Brown, et al, IEEE Transactions on Electron Devices, vol. 40, No. 2, Feb. 1993, pp. 325–333.

*Primary Examiner*—Ira S. Lazarus
*Attorney, Agent, or Firm*—Ann M. Agosti; Marvin Snyder

[57] ABSTRACT

Combustion in a boiler burner is controlled through use of flame spectroscopy in order to achieve low $NO_x$ emissions in the exhaust. By monitoring the combustion flame in the boiler burner to determine intensity of ultraviolet spectral lines, and dynamically adjusting the fuel/air ratio of the fuel mixture such that this intensity remains below a predetermined level associated with a desired low level of $NO_x$ emissions, the boiler burner produces significantly reduced $NO_x$ emissions in its exhaust but at a sufficiently high combustion flame temperature to avoid any undue risk of flame-out, thereby assuring stable, safe and reliable operation.

13 Claims, 6 Drawing Sheets

COMBUSTION CONTROL FOR PRODUCING LOW $NO_x$ EMISSIONS THROUGH USE OF FLAME SPECTROSCOPY

RELATED APPLICATIONS

This application is a continuation-in-part of application Ser. No. 08/226,528, filed Apr. 12, 1994, which is a continuation-in-part of application Ser. No. 08/047,936, filed Apr. 19, 1993, now U.S. Pat. No. 5,303,684, issued Apr. 19, 1994, which is a division of application Ser. No. 07/878,933, filed May 5, 1992, now U.S. Pat. No. 5,257,496, issued Nov. 2, 1993, each of which is herein incorporated by reference.

BACKGROUND OF THE DISCLOSURE

1. Field of the Invention

This invention relates to methods and apparatus for controlling combustion to minimize nitrogen oxide emission and, more particularly, to the use of flame spectroscopy to control boiler burner combustion in a manner that reduces nitrogen oxide emissions without increased risk of flame-out.

2. Description of the Related Art

A boiler burner is a combustor for heating water to generate steam to drive a system such as, for example, a steam turbine. Fuel for a boiler burner can include materials such as coal, oil, natural gas or a combination including these materials. As with all forms of combustion, boiler burners emit an exhaust stream that contains various combustion products. While some of these combustion products, such as water vapor, are essentially harmless to the environment, others may not be and, for that reason, are classified as pollutants. Accordingly, a major effort is presently underway to reduce pollutant emissions, especially emissions of various forms of nitrogen oxide, collectively referred to as "$NO_x$".

For a steam turbine, $NO_x$ emissions increase significantly as the boiler burner combustion temperature rises. Operating a boiler burner in a so-called "lean-burn" condition, which involves use of a lean mixture of fuel and combustion air (i.e., a relatively low fuel-to-air ratio), reduces the combustion temperature to a level that significantly reduces $NO_x$ emissions. However, if the mixture is too lean, the boiler burner exhibits operational instabilities which may increase to a point at which the combustion flame is extinguished, i.e. a "flame-out" occurs and the boiler burner ceases generating power.

To assure that a flame-out will not occur in an engine, the engine is frequently adjusted to operate with a "rich" fuel/air mixture, i.e., with a relatively high fuel-to-air ratio. While this results in stable engine operation, it also produces high $NO_x$ emission levels. While heretofore such high $NO_x$ emission levels have been tolerated as a cost of safe operation, environmental concerns have heightened to the point at which these emission levels need to be significantly reduced but with no ensuing diminution in operational safety.

Traditionally, most boiler burners for steam turbines rely on using a fuel-to-air mixture that is preset during manufacture and testing to conform with an expected operating condition for the burner, e.g. a mixture that will establish a "rich" condition. Apart from a control for regulating fuel flow, boiler burners generally employ no other adjustments that can be used to dynamically change the burner's operation, let alone change the fuel/air mixture to reduce $NO_x$ emissions.

Currently, there is no known closed-loop feedback technique for controlling a boiler burner to operate in a lean-burn condition. This is due to both the paucity of usable boiler burner adjustments, as noted above, as well as various difficulties associated with accurately detecting the level of $NO_x$ emissions produced and abating these emissions in real-time by adjusting the fuel-to-air ratio of the burners.

One technique involves controlling the fuel-to-air ratio of multiple flames based on measurements of two single spectral lines in each flame: an infrared carbon dioxide ($CO_2$) line at 4.41 μm (micrometers) and an ultraviolet hydroxyl (OH) line at 300 nm (nanometers), respectively. An intensity ratio based on the measured values of these two lines for each flame is determined and then used to separately control the fuel/air mixture of that flame in order to achieve near stoichiometric combustion, which advantageously occurs at a fuel-to-air ratio that reduces the amount of $NO_x$ that heretofore has generally been emitted. See, e.g., F. Fraim, "Research into a Spectral Flame Analyzer Phase 1—Final Report for the Period Apr. 21, 1983–Jun. 30, 1985", Work Performed under United States Department of Energy Contract DE-AC07-831 D12463, Jun. 1, 1985. Specifically, while suitable detectors, such as photodiodes, exist that can readily sense infrared radiation, the high temperature of certain engines causes various engine components to emit intense amounts of radiation over the entire infrared spectrum. In addition, the boiler flame generally produces a large amount of unburned "slag" particles which themselves function as infrared black body radiators in contrast to a "clean" natural gas flame which does not produce such particles. The resulting background level of infrared radiation can be sufficiently high to completely, or almost completely, mask the radiation associated with the $CO_2$ spectral line as well as radiation associated with other desired spectral components in the infrared spectrum. Consequently, any technique predicated on measuring radiation in the infrared spectrum produced by the flame would likely be impaired by the radiant energy produced by the hot combustor compartment itself and thus provide highly erroneous measurements.

Thus, a need exists for a technique that can substantially reduce $NO_x$ emissions by operating the boiler burners in a "lean-burn" condition. Such a technique should not rely on detection of infrared emissions and should provide closed-loop feedback control to assure stable burner flames. In addition, the technique should be readily amenable to inclusion in existing boiler burner systems, on a retrofit basis, as well as to inclusion in new boiler burners during their manufacture.

SUMMARY OF THE INVENTION

The intensity of the spectral lines in the ultraviolet region, situated within, for example, a band of approximately 200–320 nm in the combustion flame of a boiler burner, such as employed, illustratively, in a steam power plant using steam turbines to generate electricity, has been discovered to be closely correlated with the fuel-to-air ratio at which the boiler burner is operating, the combustion flame temperature within the boiler burner, and the amount of $NO_x$ exhaust emissions that will be produced. By monitoring intensity of this band of lines for the combustion flame and dynamically adjusting the fuel-to-air ratio of the boiler burner such that this measured intensity remains below a predetermined level associated with a desired low level of $NO_x$ exhaust emission, such as approximately 25 ppm (parts/million), the boiler burner will continually produce significantly reduced $NO_x$ exhaust emissions but at a sufficiently high combustion flame temperature to preclude the instabilities that lead to a flame-out condition, thus facilitating stable, safe and reliable operation.

Advantageously, this band of ultraviolet lines is spectrally isolated from other spectral lines that occur in the flame and is relatively unaffected by infrared and/or visible light emissions from either the exhaust stream or hot burner components. As such, the $NO_x$ emissions in the exhaust can be accurately, though inferentially, determined even in the presence of the substantial background radiation from the boiler burner and the exhaust stream.

In accordance with a preferred embodiment of our invention, the intensity of the band of ultraviolet spectral lines is detected through a suitable high temperature detector, such as a silicon carbide (SIC) photodiode. Such photodiode has a spectral response characteristic that exhibits good ultraviolet sensitivity for wavelengths between 200 and 350 nm, as set forth in D. M. Brown et al., "Silicon Carbide UV Photodiodes", *IEEE Transactions on Electron Devices*, Vol. 40, No. 2, Feb. 1993, pp. 325–333, hereby incorporated by reference. Such photodiode provides a measurement value representing an integral of the intensity over all the spectral flame emission lines in the 200–320 nm band. Advantageously, SiC photodiodes, irrespective of the size of the energy bandgap, are insensitive to infrared radiation.

The diode output signal, after suitable signal conditioning, scaling and digitization, is first converted, typically through a table look-up operation implemented within a microcomputer system, into a corresponding actual value for $NO_x$ emission concentration. Thereafter, the microcomputer system ascertains any difference between the actual $NO_x$ concentration value (or flame temperature) and a desired value thereof representing the desired operating condition and converts the difference, through another table look-up operation, into a corresponding positional error signal. A fuel-to-air ratio flow control assembly functions to dynamically vary the fuel/air mixture for any given position. With this arrangement, the positional error signal is supplied, through suitable drive circuitry, to an actuator that drives each such control to an appropriate setting that adjusts the fuel-to-air ratio to operate the boiler burner continually in a "lean-burn" condition with CO and $NO_x$ emission levels in the exhaust being accurately maintained, in real-time, at their desired low levels but with a sufficiently high combustion flame temperature to prevent a flame-out condition from occurring.

Most boiler burner arrangements produce a plurality of individual flames, and it is appropriate to have respective detectors for the corresponding flames. Some other boiler burners produce a single combustion flame which is not likely to be uniform throughout its entire volume. In this regard, a conventional boiler burner system contains a number of fuel injectors arranged around the combustion chamber. Flame nonuniformities may result from, for example, slight imbalances in fuel flow among these injectors and/or slight air flow irregularities within the combustor stage itself. Such nonuniformities may result in localized differences in flame temperature which lead to an increased level of $NO_x$ emissions exhaust and attributable to different performance of one injector compared to that of another injector. Accordingly, a feature of our invention allows the combustion flame to be measured at multiple points around the combustion chamber and controlled in a locally distributed fashion to reduce these flame nonuniformities, thereby reducing the overall level of $NO_x$ in the exhaust. Specifically, a series of SiC photodiodes (or other suitable ultraviolet detectors) are preferably situated around the combustion chamber, with adjacent diodes being uniformly spaced apart. Each diode is mounted in a suitable housing affixed to an external surface of the combustion chamber and properly aimed to monitor, through a suitable optical high temperature window, a portion of the combustion flame in a volumetric region near each corresponding fuel injector. A separate fuel flow control assembly is associated with each such injector. The measurements obtained through these diodes can be averaged by the microprocessor to establish an average error signal for application to each of the controls. Alternatively, the output signal of each diode can be used by the microprocessor to establish an error signal for controlling the corresponding fuel injector. In either case, use of simultaneous measurements of flame ultraviolet spectral emissions from multiple detectors will result in $NO_x$ exhaust emission and flame temperature control of greater accuracy than obtainable through use of a single ultraviolet detector.

Accordingly, one object of the present invention is to provide a control for combustion within a boiler burner to minimize $NO_x$ emission.

Another object of the present invention is to provide a boiler burner control system utilizing a silicon carbide photodiode to monitor radiation from the burner flame in a band of non-infrared wavelengths.

Another object of the present invention is to provide a combustion control for a boiler burner that minimizes $NO_x$ and CO emissions through monitoring of ultraviolet radiation produced by the flame.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawing(s) in which:

DETAILED DESCRIPTION

The broad teachings of our invention for substantially reducing $NO_x$ emissions are applicable to nearly any combustor that relies on combustion of a mixture of hydrocarbon-based fuel and air to generate power and, as a by-product, produces nitrogen oxides. Although these combustors include turbine engines, such as used in land, marine or aeronautical applications, for the sake of brevity the invention is hereinafter described for use with, illustratively, a boiler burner. Moreover, the flame produced by almost any form of gaseous or liquid hydrocarbon burner can be detected and monitored, for all purposes of control, including those required to minimize $NO_x$ and CO emissions, by use of the teachings herein.

Figure 1:
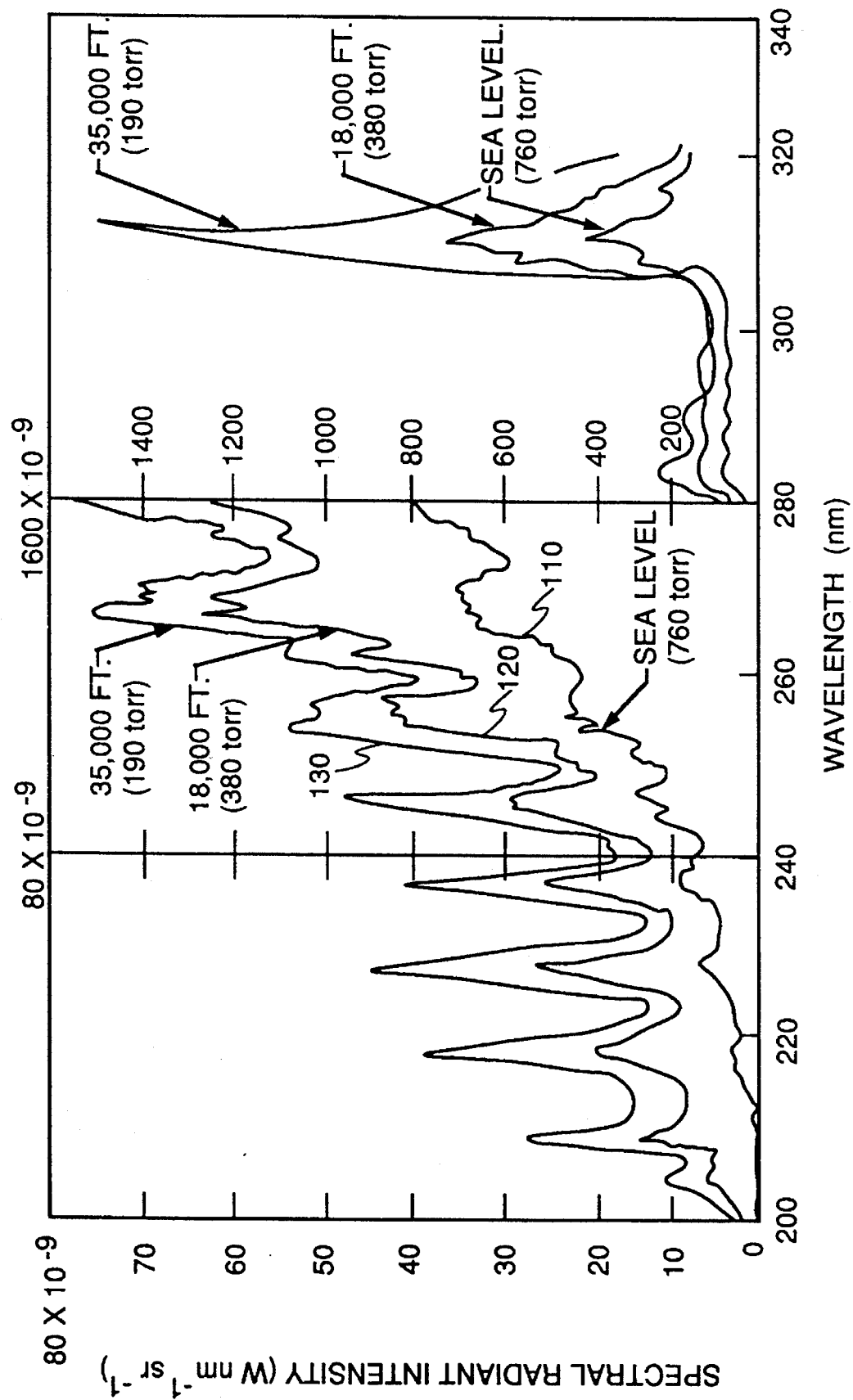
FIG. 1 graphically illustrates various ultraviolet spectral emissions, in the range of 200–340 nm, from JP-4 jet fuel burning at various altitudes.

FIG. 1 graphically illustrates various ultraviolet spectral emissions, in the range of 200–340 nm, from JP-4 jet fuel burning at various altitudes. Typical ultraviolet spectral emission lines that occur exist within a band extending from 200 nm to 340 nm. An intense spectral emission located at approximately 310 nm is attributable to the presence of the hydroxyl radical (OH), while the spectral emissions below approximately 260 nm are believed to result solely from the presence of carbon monoxide (CO). Multiple distinct spectral emission lines occur between approximately 200 nm and approximately 320 nm in wavelength. Fortunately, spectral radiance from exhaust, as well as black body radiation emanated by hot particles of unburned fuel components contained in the combustion flame, is primarily concentrated in the infrared spectrum and is essentially negligible under 400 nm in wavelength. Consequently, these effects, which would mask spectral measurements in the infrared and visible regions, will not corrupt spectral measurement at these ultraviolet wavelengths.

Through spectral measurements of a combustion flame in a high pressure gas turbine test rig, a strong correlation has been found to exist between intensity of ultraviolet emissions for the combustion flame and the fuel-to-air ratio. As air flow increases, flame temperature decreases, causing a change in the collective intensity of CO and OH spectral emission lines. The OH emission band centered at 310 nm has been shown by experimental measurements to be especially helpful because of its high intensity.

The concentrations of CO and $NO_x$ in the exhaust of a hydrocarbon combustion flame vary with flame temperature. In this regard, curves 210 and 220 of FIG. 2 respectively show the expected dependence of the concentration of emitted CO and $NO_x$ on temperature of the combustion flame. As shown, CO concentration decreases steeply with increasing flame temperature, reaching a knee (at point P) at approximately 1710° K. This concentration continues to decrease at an increasingly slower rate until the flame temperature reaches approximately 1800° K., after which the concentration slowly increases with further increases in flame temperature (not shown). Furthermore, substantial levels of emitted CO, indicated by dashed line 230 at a relatively low flame temperature FO, indicate onset of a flame-out condition. CO emission levels increase exponentially as flame temperature is reduced below the flame temperature associated with point P. A desired environmental limit on such CO emissions is shown as level $E_{CO}$. The $NO_x$ concentrations remain quite low (typically less than 25 ppm) at low flame temperatures, such as below approximately 1740° K., but undergo an exponential rise at increasingly higher combustion temperatures.

Figure 2:
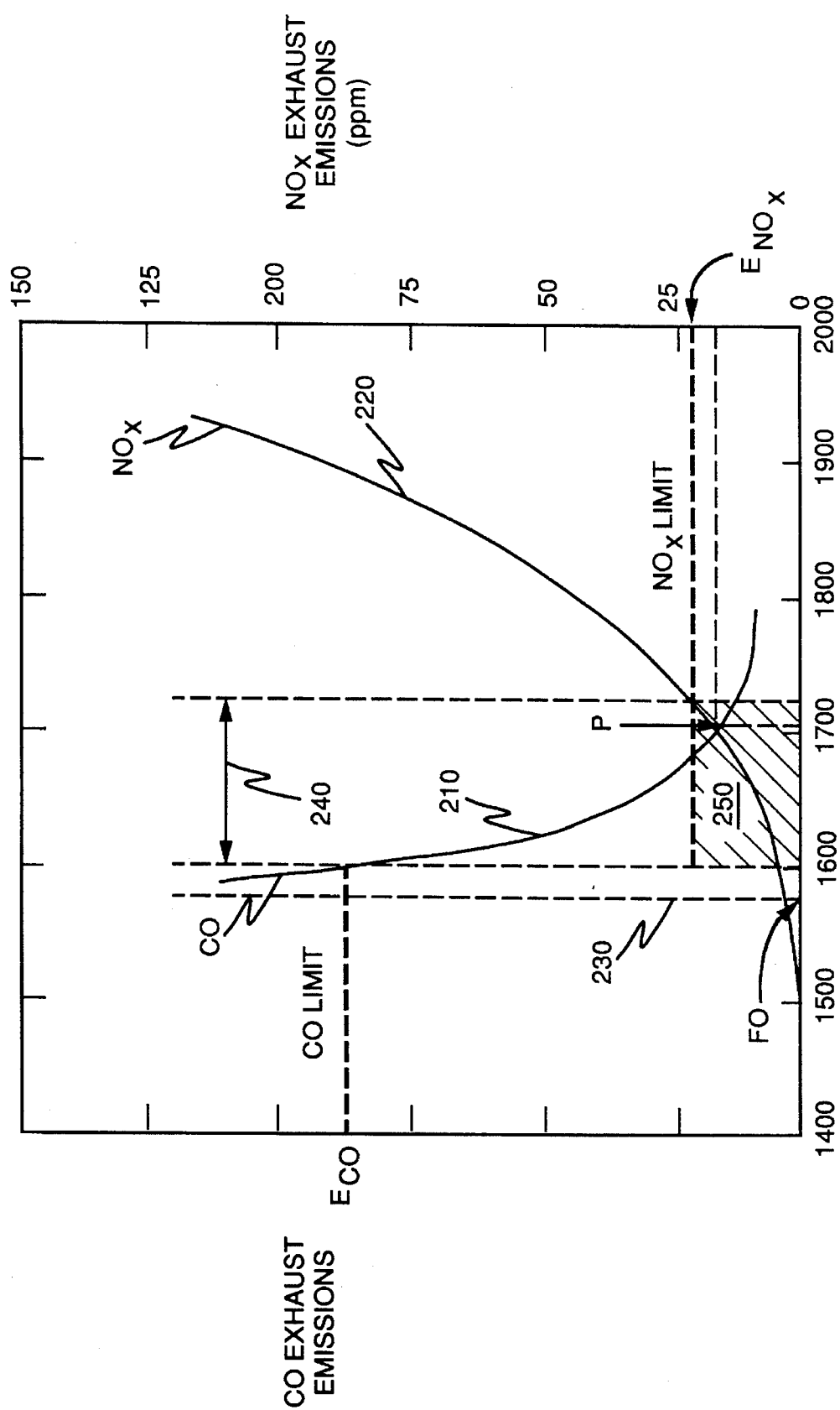
FIG. 2 graphically illustrates relative concentrations of CO and $NO_x$ in the exhaust of a hydrocarbon combustion flame, plotted as a function of combustion flame temperature.

To avoid a flame-out condition, while advantageously reducing both CO and $NO_x$ exhaust emissions below corresponding desired environmental limits (slightly less than approximately 25 ppm, as indicated by level $E_{NOx}$), a burner should be operated within a relatively small flame temperature band 240 and particularly within rectangular operating region 250 that encompasses point P, as shown in FIG. 2. Since the $NO_x$ limit $E_{NOx}$, in ppm, is numerically lower than the CO limit $E_{CO}$, the $NO_x$ limit defines the upper boundary of operating region 250.

A boiler burner operated in a "lean-burn" condition emits $NO_x$ at levels of 25 ppm and less. Ideally, then, to minimize both $NO_x$ and CO concentrations in the exhaust, a burner should be operated approximately at point P of FIG. 2, i.e. with a flame temperature of approximately 1700° K. Point P exists within a narrow operating temperature bandwidth, i.e., approximately 120° K. Hence, if the fuel mixture should become so lean as to result in a sufficient decrease in flame temperature, the burner may undergo operational instabilities which can quickly increase to a point at which the combustion flame is extinguished and the boiler burner ceases generating power.

In accordance with the invention, by monitoring intensity of the CO and/or OH lines for the combustion flame within a band of approximately 200–320 nm, which falls within the ultraviolet portion of the spectrum, and dynamically adjusting the fuel-to-air ratio of the combustor to keep the measured intensity below a predetermined level associated with a desired level of $NO_x$ emissions (such as that associated with point P in FIG. 2), the boiler burner will produce significantly reduced $NO_x$ emissions in the exhaust but at a sufficiently high combustion flame temperature to prevent occurrence of a flame-out condition while simultaneously facilitating stable, safe and reliable operation. Because, as noted above, this band of ultraviolet lines is spectrally isolated from other spectral lines that occur in the flame and is relatively unaffected by infrared and/or visible light emissions from either the combustor or the furnace walls, the $NO_x$ emissions in the exhaust can be accurately determined despite substantial background radiation emissions. The intensity of this band of spectral lines is detected by a silicon carbide photodiode, which has good sensitivity between 200 and 350 nm as pointed out by D. M. Brown et al., supra. Specifically, a separate respective diode can be used to detect the flame characteristics in the vicinity of each burner or in the vicinity of several burners in the boiler burner. The output signal of each such diode, processed through a suitable microprocessor, is supplied to a fuel flow control assembly to dynamically vary the amount of fuel supplied to a corresponding burner. The fuel supplied to all the burners is collectively adjusted through the fuel flow control assemblies to dynamically adjust the fuel/air mixture of the burners, in real-time, to operate the boiler burner in a lean-burn condition while maintaining the combustion flame at a sufficiently high temperature to prevent flame-out.

Figure 3:
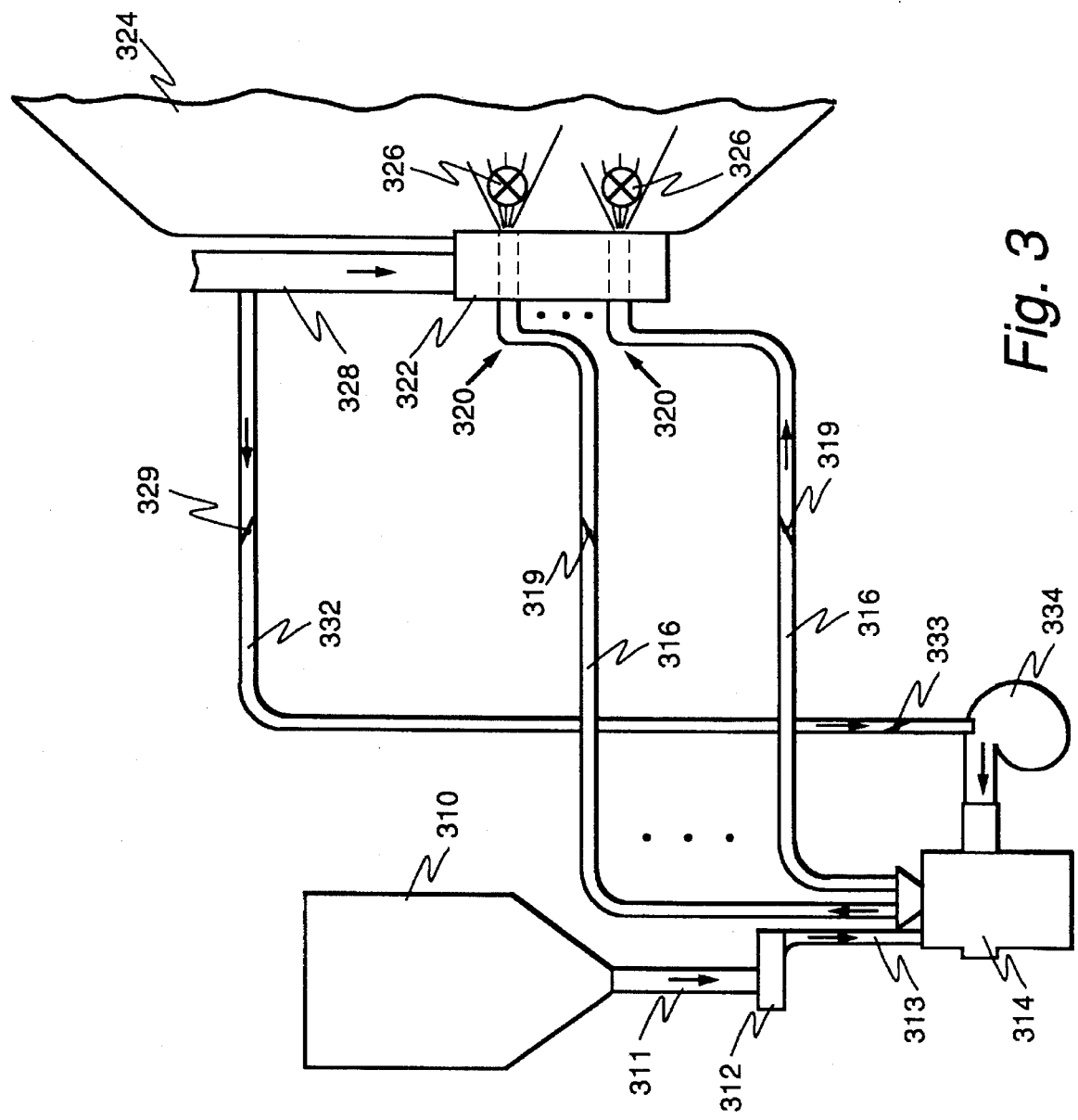
FIGS. 3–5 are simplified outlines drawings of boiler burners that incorporate the present invention.
Figure 4:
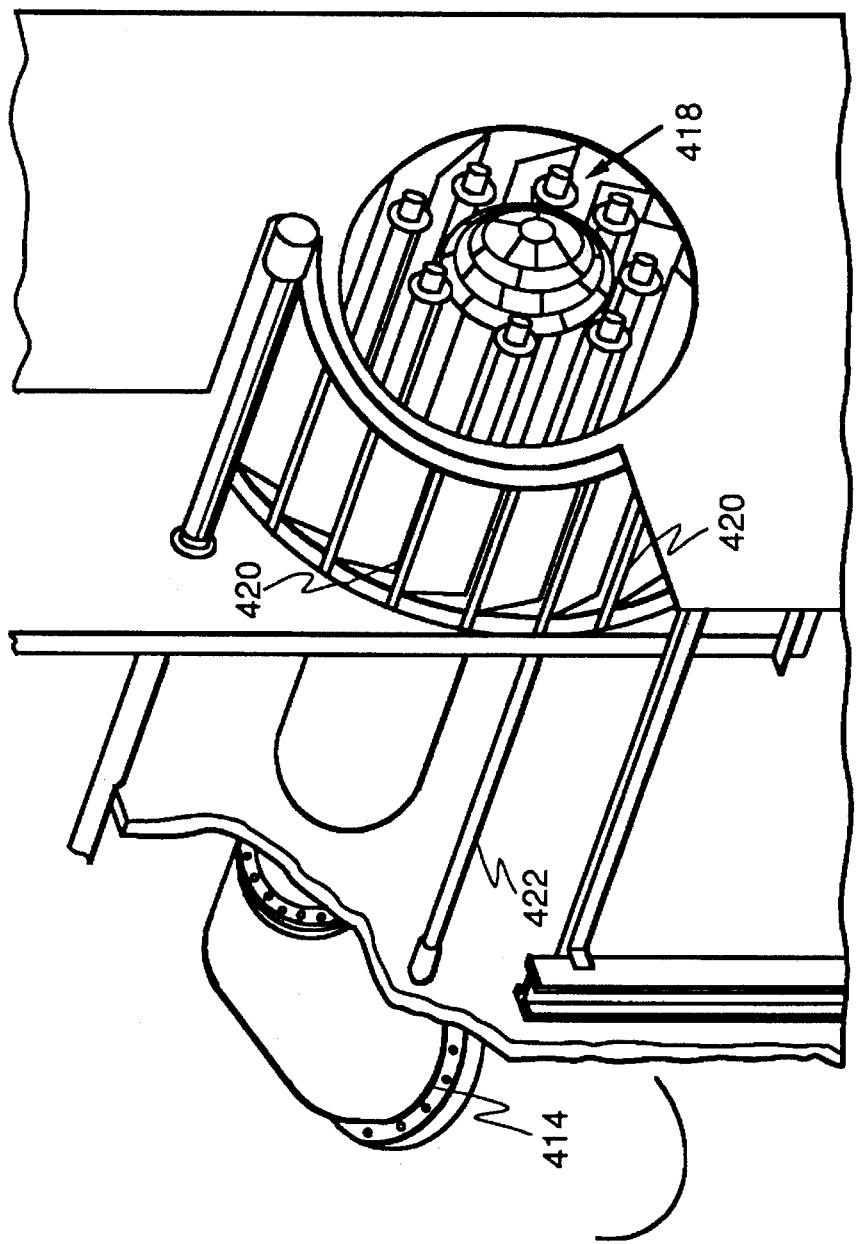
Figure 5:
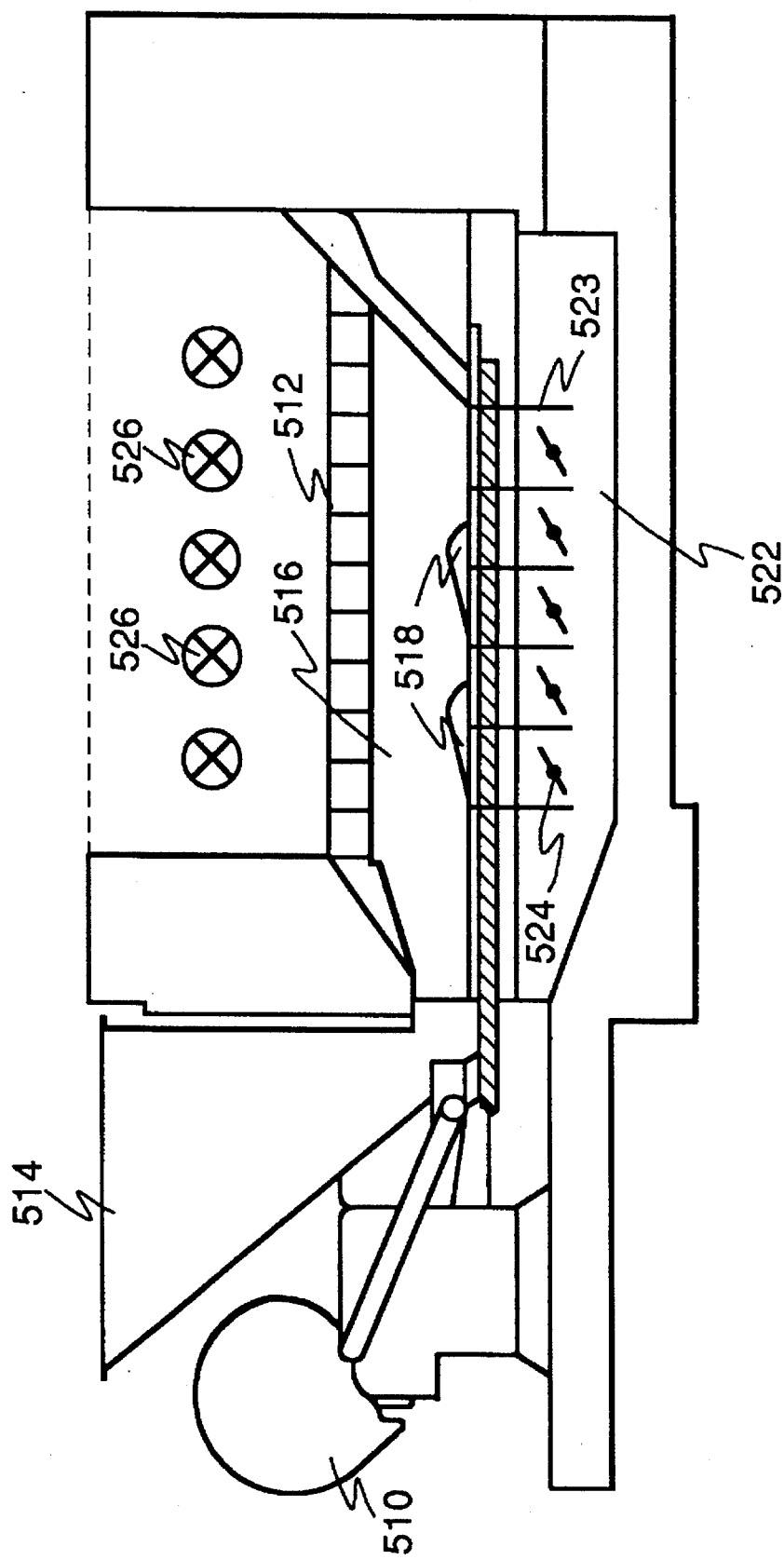

With this overview, FIGS. 3–5 are simplified outline drawings of boiler burners that incorporate the present invention. At least two methods of coal burning to generate high temperature steam are possible. The most advanced methods use finely powdered coal and are configured to supply air and coal dust much in the same manner as is done in gas turbines. In fact, these coal burning boiler systems can run on oil, natural gas, or powdered coal. Another method for coal burning is to use a deep coal bed of coarse coal and supply air to the bed using a forced air supply. In both methods, the water (or steam) is pumped through tubes inside a casing that surrounds the burners. There are other types of furnace burners that can be used to generate heat for heating of gases and even melting of metals (i.e. blast furnaces for making steel).

FIG. 3 illustrates a direct-firing system for pulverized coal which can also burn natural gas or oil. Coal is processed through a raw coal bunker 310, a coal feeder 312, a pulveriser 314, and a plurality of respective fuel lines 316. The fuel lines include primary air used to transport the coal to the burner. The primary air is supplied from boiler air heater 328 through appropriate piping 332 (including any appropriate air dampers 329 and 333) and a primary air fan 334. Fuel flow damper controls 319, which may include vernier valves, can be used to affect the rate of fuel delivered to respective fuel burners 320. The fuel burners are situated in a burner windbox 322 and combine the coal/primary air mixture with secondary air for delivery to a furnace for combustion.

Each burner is separately connected to a respective fuel line 316 having a fuel/air mixture adjustable by a fuel flow control assembly. In the case of a pulverized coal-burning system the fuel flow control assembly may take one of several forms because the fuel/air mixture can be affected by (1) adjusting the rate of coal feed 312; (2) adjusting the rate of primary air supplied through primary air fan 334; and/or (3) adjusting a fuel flow damper 319. The feeder, primary air supply, and appropriate fuel flow valves for a respective burner will be referred to as a respective "fuel flow control assembly". The rate of coal feed and the rate of primary air in the embodiment of FIG. 3 are generally controlled, whereas each fuel flow control assembly can have a respective, individually controlled fuel flow damper. The feeder, primary air, and/or flow damper can be directed by a control system, as discussed with respect to FIG. 6.

The flame detectors 326, which may include SiC photodiodes, for example, to look at the emission lines in the flame, can be mounted in the wall of the boiler and pointed at the base of the flame. To detect the spectral emissions from a portion of the combustion flame attributable to a respective burner, an ultraviolet optical detector is secured to the outer wall of the combustion stage near each respective burner and, through a suitable high temperature optical window, monitors that portion of the flame. In this regard, a detector assembly 326 (only two individual detectors are specifically shown) is mounted. Each individual detector is mounted in the vicinity of a respective burner.

Figure 6:
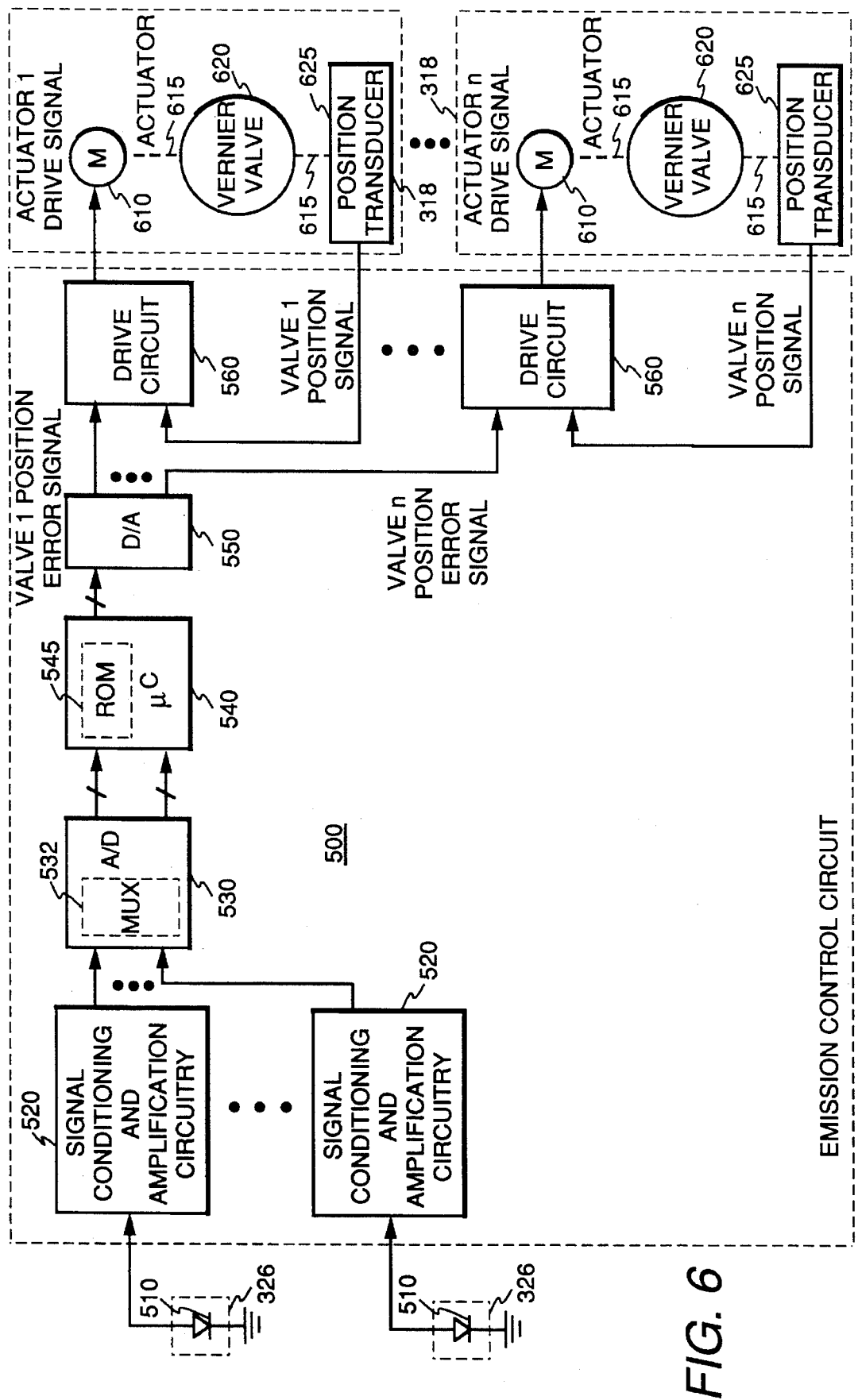
FIG. 6 is a high level block diagram of an emission control circuit and its related components.

The outputs of the individual detectors are routed to emission control circuit 500 (shown in FIG. 6). This circuit generates suitable drive signals through use of both the output signals produced by the detectors and feedback signals produced by the fuel flow control assemblies. Each drive signal is applied to a respective actuator (not shown) located within a corresponding fuel flow control assembly. The respective actuator appropriately changes at least one element of the control to increase or decrease the amount of fuel flowing to the corresponding burner and hence therefrom into the combustion chamber itself. Each of the position feedback signals specifies the position of the valve element or elements to appropriately vary the fuel/air mixture for all the burners such that the boiler continuously operates at a desired "lean-burn" condition.

In order to monitor the ultraviolet spectral emissions produced for each flame, an optical window (not shown) is appropriately mounted. This window comprises any of a variety of appropriate well-known high temperature materials, such as quartz, which is substantially transparent to ultraviolet wavelengths above 200 nm.

Detector assembly 326 includes an ultraviolet detector which is appropriately positioned to capture ultraviolet emissions emanating from the base of the flame. Depending upon the size of the detector and the window, a suitable lens (not shown) may be interposed between the window and the ultraviolet detector to concentrate incident emissions onto an active portion of the detector itself. In order to provide excellent ultraviolet sensitivity and also proper operation at elevated temperatures (typically on the order of a few hundred degrees F) encountered near the external surface of a combustor wall, a silicon carbide (SIC) photodiode is employed as the ultraviolet detector. One such illustrative photodiode, which is particularly useful for jet engine flame detection and incorporated herein by reference, is fully described in D. Brown et al. co-pending U.S. patent application "SILICON CARBIDE PHOTODIODE WITH IMPROVED SHORT WAVELENGTH RESPONSE AND VERY LOW LEAKAGE CURRENT", Ser. No. 07/878,937, filed May 5, 1992, now abandoned in favor of continuation application Ser. No. 08/198,679, filed Feb. 18, 1994 and assigned to the instant assignee.

FIG. 4 illustrates another technique which can be used in place of or in combination with the damper structure of FIG. 3 as part of a fuel flow control assembly to control the fuel-to-air ratio of a burner. As shown in FIG. 4, secondary air register doors 420 can be controlled by the feedback system by actuating registry rods 422 to affect the flow of air to each individual fuel burner 418.

FIG. 5 is an example of a boiler furnace that burns lump coal. The coal is rammed from a coal bin 514 with a forced draft fan 510 into a retort 516. A series of small auxiliary pushers 518 in the bottom of the retort assist in moving the fuel and, as the retort is filled, the coal is moved to each side over air admitting tuyers 512 and side grates. As the fuel rises in the retort and is subjected to heat from the burning fuel above, volatile gases are distilled off and mixed with air supplied through the tuyeres above each side of the retort and through the side grates. The volatile mixture burns as it passes upward through the incandescent zone, sustaining ignition of the rising fuel. Burning continues as the incoming raw coal continually forces the fuel bed to each side.

The air supply through conventional air plenums 522 is common to all portions of the retort, and because coal is supplied slowly and continuously, fuel flow control is not practical. In order to compartmentalize the flame zone, the air plenum of the present invention is segmented so that air is directed to different portions of the coal bed. The segmentation of the air flow can be represented by vertical lines depicting square cross-sectional air ducts 523 (one set on each side of the retort). At the bottom of each air duct a damper 524 is added so as to vary the air flow to that section of the coal bed above it. Each damper may, in one embodiment, comprise a valve with an actuator that is controlled by control system 500 in response to the signal from the photodiode. In this case each respective "fuel flow control assembly" would include the coal supply and the respective damper. The flame sensors 526 are centered above these air ducts above the coal bed and mounted in apertures in the combustion chamber wall.

FIG. 6 is a high level block diagram of emission control circuit 500, usable with the structures shown in FIGS. 3–5, and its related components. Detector assemblies 326 which contain SiC photodiodes 510, are coupled to circuit 500 which, in turn, is coupled to selected valves and/or other air and fuel controls. In one embodiment, each of several fuel flow control assemblies 318 includes at least one actuator 610 having a control valve or damper, shown as valve 620, and a position transducer 625 connected thereto typically through common shafting 615. Although the choice of actuator is not critical, it must withstand operation at the elevated temperatures near the external surface of the combustor wall and generate sufficient force to rapidly change the position of the valve to a new position and, in conjunction with the associated drive circuit, accurately maintain this new position. The actuator can be any one of a variety of suitable motors, such as an appropriately sized stepping motor or DC servo motor, or it may comprise a solenoid. The position transducer can be either analog or digital. The encoder preferably should also provide a nondestructive reference position that can be mechanically set, during assembly of the associated valve assembly, to coincide with a known "home" valve position, i.e. fully open or closed. This reference position can be used by drive circuits 560 in initializing their operation.

Circuit 500 contains signal conditioning and amplification circuits 520; a multiplexed analog-to-digital (A/D) converter 530; a microcomputer 540, which may comprise any one of a variety of well-known conventional microcomputers; a digital-to-analog converter 550; and drive circuits 560. Each of the signal conditioning and amplification circuits is coupled to an associated ultraviolet detector 510. The current flow through such diode is governed by the amount of ultraviolet radiation incident on the diode. Each of circuits 520 operates to convert the current flow through an associated photodiode into a corresponding voltage signal, and then amplify, linearize, filter and scale this signal. The resulting analog signals produced by circuits 520 are supplied individually to multiplexed A/D converter 530 which, in turn, converts each such signal, in seriatim, into a digital value. the resulting digital values are routed, in parallel, to microcomputer 540 for subsequent processing. Under program control, the microcomputer provides instructions and control signals to multiplexed A/D converter 530 to select, via input multiplexer 532 of the A/D converter, which particular analog signal produced by circuits 520 is to be digitized at any one time.

The measured intensity, i.e. the photodiode output signal, correlates well with the fuel/air mixture setting, the $NO_x$ concentration in the exhaust, and the flame temperature. These results indicate that the intensities of the ultraviolet spectral emission lines are optical precursors of temperature and $NO_x$ production in the primary combustion zone. Hence, excellent dynamic real time control can be established by first relating the detected spectral intensity levels to preferably corresponding $NO_x$ emission levels and then appropriately controlling the $NO_x$ emission level, through use of a closed-loop feedback system, to a desired value.

In response to the digitized values produced by A/D converter 530 for each diode, microcomputer 540 internally generates a positional error signal for each corresponding fuel flow control assembly. This error signal represents an appropriate change (both in terms of direction and magnitude) in position for that valve in order to properly change the corresponding fuel/air mixture produced by that assembly to assure that the actual $NO_x$ exhaust emission concentration (or flame temperature which will produce this concentration), as indirectly measured through the photodiode, will be controlled to dynamically coincide with a desired value thereof. Through this closed-loop control methodology, the position of each valve is dynamically changed as needed to maintain its corresponding positional error signal at zero. Inasmuch as the maximum $NO_x$ and CO emission limits are $E_{NOx}$ and $E_{CO}$, as shown in FIG. 2, then through dynamic control of the fuel/air mixture for all the valves such that the boiler burner continuously operates within region 250 of FIG. 2 (and preferably at point P) throughout its full range of power, both CO and $NO_x$ exhaust emissions can be reduced below these limits while maintaining a sufficiently high flame temperature to avoid a "flame-out" condition and unstable flames.

In order to generate each positional error signal, microcomputer 540 first converts a digitized value provided by A/D converter 530 for each diode into a corresponding actual $NO_x$ exhaust concentration value. This conversion is preferably accomplished through interpolation of stored values provided by a first look-up table stored in a read only memory (ROM) 545 of the microcomputer. Thereafter, the microcomputer measures any difference between the value of the actual $NO_x$ concentration and a desired value thereof. This measured difference is converted through another table look-up operation into a corresponding value for the positional error signal, through use of a second table of values stored in ROM 545 that relates this difference to a stored value. The look-up tables are established from appropriate empirical measurements. To reduce the size of the look-up tables, mathematical interpolation may be used in conjunction with retrieval of appropriate stored values from either table. Alternatively, if processing time and other design considerations permit, an appropriate mathematical formula, such as determinable through appropriate curve fitting of empirical data, can be calculated in lieu of performing table look-up operations. Microcomputer 540 generates a separate digital position error signal for each different fuel flow control assembly. These digitized error signals are then converted into analog form by digital-to-analog (D/A) converter 550 which, in turn, supplies a separate analog error signal to each of drive circuits 560. Each of these drive circuits generates an actuator drive signal which, based upon the existing valve position feedback signal supplied by a corresponding valve assembly and the corresponding valve position error signal, cause the actuator in that assembly to rotate the valve element therefor in a direction which drives this position error signal to zero.

While the control methodology has been described above in terms of generating a separate position error signal for each ultraviolet detector or photodiode, the microcomputer can alternatively average the digitized values produced by A/D converter 530 for all the photodiodes together and provide a single position error signal to all the drive circuits to appropriately and identically vary the position of all the valves in unison. While this alternative methodology is not likely to provide control over the fuel/air mixture that is as locally accurate as obtainable through use of separate position error signals, the overall results, i.e. in terms of $NO_x$ emission concentration and combustion flame temperature, attained through either methodology, will be very similar. Nevertheless, with either methodology, use of simultaneous measurements of flame ultraviolet spectral emission from multiple ultraviolet detectors can facilitate more accurate $NO_x$ emission and flame temperature control than obtainable through use of a single ultraviolet detector.

Although each valve has been described as being connected in parallel with a corresponding fuel line that is connected to a fuel injector, each valve can alternatively be connected in series between the fuel supply and fuel injector. However, a parallel connection would likely be favored to permit fuel to flow to the injector should a valve fail in a closed position. Moreover, to enhance failure response, a digitally activated switch can be connected, respectively, in series with each drive circuit and its respective associated D/A converter circuitry. The switch can apply either an analog position error signal generated by D/A converter 550 or a fixed analog reference signal associated with a predetermined desired valve position, e.g. closed, half-open or fully-open, to each corresponding drive circuit. In use, the switch can be operated by a well-known "watchdog" timer which is continually reset, e.g. on a continuously-timed interrupt basis, by the microcomputer. As long as the microcomputer is properly operating, the timer will not reach the end of a preset timing interval, i.e. will not "time-out", and hence the switch will continue to apply the analog position error signal to its corresponding drive circuit. However, should the microcomputer fail, the watchdog timer will "time-out", causing, for example, all the switches to by-pass the microcomputer and route the reference signal to each drive circuit. This, in turn, will cause the drive circuits to maintain each of the valves in these known positions. The watchdog timer can also be used to activate a suitable warning indicator that alerts service personnel to this failure condition.

Furthermore, while the foregoing methodology has been described primarily in terms of measuring, at least indirectly, and preferably tracking $NO_x$ emissions based upon intensity of the ultraviolet flame emission spectra, the high correlation, as previously noted, between these emission spectra and either the $NO_x$ concentration or the combustion flame temperature permits either of these latter two parameters to be used to dynamically control the boiler burner, on a closed-loop feedback basis, to operate continuously in a "lean-burn" condition. Moreover, to the extent that flame temperature can be measured directly, such as through use of a suitable thermocouple situated in the combustion flame, the valve assemblies can be directly controlled in accordance with measured flame temperatures. However, since manufacturers generally do not incorporate temperature sensing devices into the combustion area of the boiler burner section of a boiler because of the high potential for damage to the boiler if the detector should fail, the optical flame detection of the type herein described is highly preferable to other forms of flame measurement.

While only certain preferred features of the invention have been illustrated and described herein, many other modifications and changes will occur to those skilled in the art. It is, therefore, to be understood that the appended claims are intended to cover all such modifications and changes as fall within the true spirit of the invention.

What is claimed is:

1. Apparatus for monitoring combustion flames in a high temperature environment and reducing nitrogen oxide ($NO_x$) exhaust emissions resulting from combustion of a mixture of hydrocarbon fuel and air within a boiler burner without undue risk of flame-out comprising:

a silicon carbide photodiode for detecting and measuring intensity of a band of ultraviolet spectral lines emanating from a combustion flame in said boiler burner;

means for converting the measured intensity value of said predetermined band of ultraviolet spectral lines into a corresponding value of a burner operating parameter, said parameter being either temperature of said flame or $NO_x$ concentration in said exhaust emissions; and means for dynamically adjusting the fuel/air mixture for said boiler burner such that the value of said burner operating parameter remains below a predetermined limit.

2. The apparatus of claim 1 wherein said photodiode is capable of detecting and measuring intensity of a band of ultraviolet spectral lines extending from approximately 200 nm to approximately 320 nm in wavelength, inclusive.

3. The apparatus of claim 1 wherein said boiler burner comprises:

a fuel flow control assembly including a valve for controllably varying said fuel/air mixture in response to a drive signal; and said apparatus comprising a circuit responsive to said fuel flow control assembly and said photodiode for generating said drive signal so as to controllably vary the fuel/air mixture in order to maintain said burner operating parameter value within a predetermined operating range.

4. The apparatus of claim 1 wherein said means for dynamically adjusting the fuel/air mixture includes an air register door.

5. The apparatus of claim 1, wherein said boiler burner comprises:

a combustion stage, including an external combustion region;

a fuel flow control assembly including an air plenum having air duct segments with respective dampers for controlling the air flow to respective portions of the external combustion region in response to a drive signal; and said apparatus comprising a circuit responsive to said fuel flow control assembly and said photodiode for generating said drive signal so as to controllably vary the fuel/air mixture in order to maintain said burner operating parameter value within a predetermined operating range.

6. The apparatus of claim 1 wherein said means for dynamically adjusting the fuel/air mixture for said boiler burner comprises means for adjusting the fuel/air mixture so as to maintain said predetermined limit for $NO_x$ concentration in said exhaust emissions at a maximum of 25 parts per million.

7. The apparatus of claim 1 wherein said means for dynamically adjusting the fuel/air mixture for said boiler burner comprises means for adjusting the fuel/air mixture so as to maintain said predetermined limit for flame temperature at a temperature above which a flame-out condition due to low flame temperature will not occur.

8. The apparatus of claim 1 wherein said boiler burner comprises:

a plurality of fuel flow control assemblies, each one of said plurality of fuel flow control assemblies including a valve for controllably varying said fuel/air mixture in response to a drive signal; and said apparatus further comprising a plurality of photodiodes and a circuit connected to each of said valves and to each of said photodiodes for generating a drive signal for each of said valves, respectively, in response to an output signal from each of said photodiodes, respectively, so as to control the fuel/air mixture within said each assembly, respectively, and thereby locally vary the fuel/air mixture attributable thereto.

9. Apparatus for monitoring combustion flames in a high temperature environment and reducing nitrogen oxide ($NO_x$) exhaust emissions resulting from combustion of a mixture of hydrocarbon fuel and air within a boiler burner without undue risk of flame-out comprising:

a combustion stage having an external combustion region and an outer wall;

a fuel flow control assembly including a valve for controllably varying the components of said mixture in response to a drive signal and for producing a position signal representing the size of the valve opening; and an optical window extending through said outer wall and providing optical communication with said external combustion region, said window being situated to permit optical emission emanating from a combustion flame in said combustion region to be detectable through said window;

a silicon carbide photodiode for detecting and measuring intensity of a band of ultraviolet spectral lines emanating from the combustion flame, said photodiode being mounted external to said outer wall and oriented with respect to said window so as to detect said optical emission through said window; and a circuit responsive to said fuel flow control assembly and to said photodiode for generating said drive signal so as to controllably vary the size of said valve opening in order to maintain the temperature of said combustion flame above a predetermined first value and below a predetermined second value.

10. The apparatus of claim 9 wherein said photodiode is capable of measuring intensity of a band of ultraviolet spectral lines extending from approximately 200 nm to approximately 320 nm in wavelength, inclusive.

11. The apparatus of claim 10 wherein the predetermined second value of said flame temperature is a temperature associated with a $NO_x$ concentration in said exhaust emissions equal to or less than 25 parts per million.

12. The apparatus of claim 10 wherein the predetermined first value of said flame temperature is a flame temperature associated with a flame-out condition in said boiler burner.

13. The apparatus of claim 1 wherein the high temperature environment includes flame temperatures in the range of 1500–1900 Kelvin.

* * * * *